E. PILON.
SPRING HOOK.
APPLICATION FILED JULY 29, 1919.

1,328,193.

Patented Jan. 13, 1920.

Inventor
Eugene Pilon

Witnesses
G. E. Walling
V. B. Hillyard.

By
Richard Bewen
Attorney

UNITED STATES PATENT OFFICE.

EUGENE PILON, OF FARMPOINT, ONTARIO, CANADA.

SPRING-HOOK.

1,328,193.  Specification of Letters Patent.  Patented Jan. 13, 1920.

Application filed July 29, 1919. Serial No. 314,110.

*To all whom it may concern:*

Be it known that I, EUGENE PILON, a subject of the King of Great Britain, residing at Farmpoint, in the Province of Ontario and Dominion of Canada, have invented certain new and useful Improvements in Spring-Hooks, of which the following is a specification.

The invention provides a hook comprising relatively pivoted members and means for yieldably holding the members in closed position so as to prevent casual disengagement of the hook from the part to which it is attached when in operation.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

In the drawing hereto attached,

Corresponding and like parts are referred to in the following description and indicated in the several views of the drawing by like reference characters.

Figure 1:
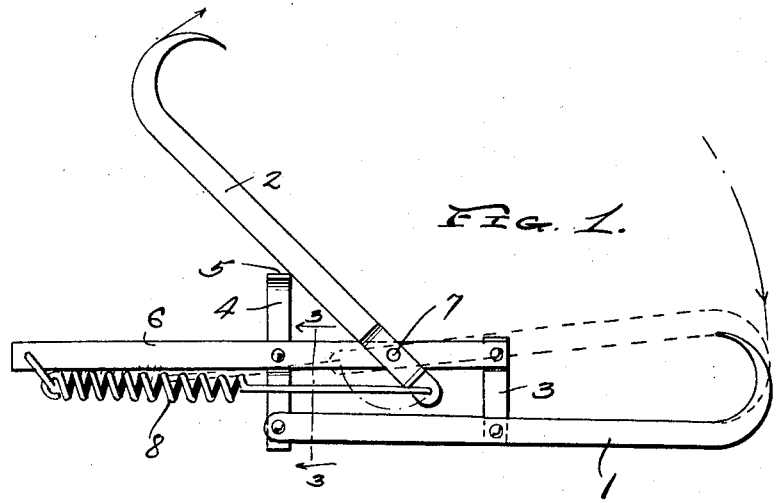
Figure 1 is a side view of a spring hook embodying the invention, the full lines showing the movable member in open position and the dotted lines indicating the position of said member when closed.
Figure 2:
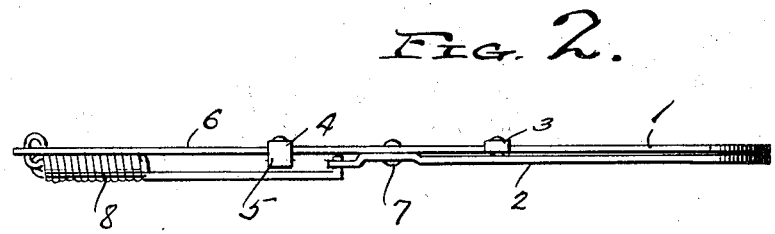
Fig. 2 is a top plan view of the hook.
Figure 3:
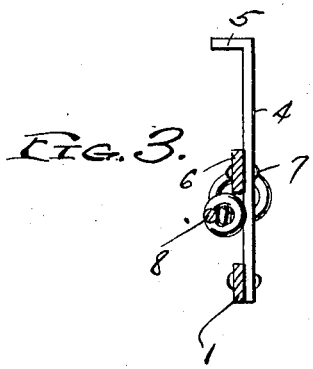
Fig. 3 is a section on the line 3—3 of Fig. 1 looking to the left, as indicated by the arrows.

The hook comprises relatively pivoted members 1 and 2. Specifically considered the member 1 is fixed and the member 2 pivoted. Each of the members 1 and 2 has its forward or engaging ends of hook-form so as to engage with a part to which the hook is adapted to be attached. The hooked ends of the members 1 and 2 are reversely disposed so as to close upon the part from opposite sides. Bars 3 and 4 are disposed perpendicular to the member and project therefrom in the same direction as the hooked end thereof. The bar 4 projects from the member 1 to a greater extent than the bar 3 and its free end has a lateral extension 5 which extends across the path of the member 2 and forms a stop to limit the opening thereof, as indicated most clearly by the full lines in Fig. 1. A bar 6 parallels the member 1 and is secured to the bars 3 and 4 and extends rearwardly from the bar 4. The member 2 is pivoted to the bar 6 at 7, the portion receiving the pivot being offset laterally so as to come in contact with the bar 6, as indicated most clearly in Fig. 2. A contractile helical spring 8 is attached at its outer end to the rear end of the bar 6 and its forward end is connected to the rear end of the member 2. The spring 8 normally holds the hooked ends of the members 1 and 2 closed, as indicated by the full and dotted lines in Fig. 1. When the hooked end of the member 2 is moved away from the hooked end of the member 1, the spring 8 is expanded and when the hook 2 is released, the spring 8 contracts and closes the members 1 and 2 and holds the hooked ends thereof in closed position. The hook is adapted for use in any capacity where it is required to employ a hook for connecting parts and which hook is required to be normally held closed by spring pressure.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. A spring hook, comprising a fixed member, a bar perpendicular to the fixed member and having a lateral extension forming a stop, a complemental pivoted member limited in its opening movement by the said lateral extension and a spring for normally holding the pivoted member closed.

2. A spring hook, comprising a fixed member, bars perpendicular to the fixed member, the rear bar projecting from the fixed member to a greater extent than the forward bar and having a lateral extension at its outer end forming a stop, a bar paralleling the fixed member and connected to the laterally disposed bars and having a rear extension, a second member pivoted to the bar paralleling the fixed member at a point between the laterally extending bars and a contractile helical spring connecting the rear end of the pivoted member with the rear end of the bar paralleling the fixed member.

In testimony whereof I affix my signature in presence of two witnesses.

EUGENE PILON.

Witnesses:
ALISIA GAUDRY,
F. A. LABELLE.